United States Patent

Fuths

[15] 3,645,363
[45] Feb. 29, 1972

[54] SPEED-REGULATING DEVICE
[72] Inventor: Gustav Fuths, Feldhorn, Germany
[73] Assignee: Olympia Werke AG, Wilhelmshamen, Germany
[22] Filed: Jan. 22, 1970
[21] Appl. No.: 4,801

[30] Foreign Application Priority Data
  Jan. 23, 1969 Germany..................P 19 03 158.4

[52] U.S. Cl.............................................188/184, 197/64
[51] Int. Cl......................................................F16d 59/00
[58] Field of Search....................188/180, 181 A, 184, 185; 197/64

[56] References Cited

UNITED STATES PATENTS

| 1,958,884 | 5/1934 | Bonnano | 188/184 |
| 2,829,754 | 4/1958 | Norcross | 188/184 X |
| 3,080,020 | 3/1963 | Hershey | 188/184 |

FOREIGN PATENTS OR APPLICATIONS

| 1,237,543 | 6/1960 | France | 188/184 |

Primary Examiner—Duane A. Reger
Attorney—Spencer & Kaye

[57] ABSTRACT

A speed-regulating device for speed-controlled components for precision mechanical application, for example, typewriter carriages, wherein the speed of a rotating shaft is regulated by varying the radial distance from the axis of the shaft of the pivotal bearings for a plurality of centrifically actuated unilaterally mounted brake levers disposed within a brake housing.

11 Claims, 3 Drawing Figures

Inventor
Gustav Fuths

By Spencer & Kaye
Attorneys

SPEED-REGULATING DEVICE

BACKGROUND OF THE INVENTION

The present invention relates to a speed-regulating device for speed-controlled components for precision mechanical applications, for example, the carriage of typewriters and similar office machines. More particularly, this invention relates to a device for regulating the speed of a rotating shaft by means of a plurality of unilaterally mounted brake levers which are operated by centrifugal force and whose pivot points or bearings are adjustably disposed within a brake housing.

When tabulating, i.e., when released by a stepping switch mechanism, the carriages of typewriters and similar office machines move at increasing speed in the stepping direction due to the effect of a carriage-tensioning spring. The increase in the speed of the carriage is mostly dependent on the mass of the carriage. In order to keep the tabs which are attached to the carriage from arriving at a tab stop with an excessive speed, and thereby possibly breaking the tabs, and in order to cause the carriage to move at a uniform speed, speed-regulating devices are presently required and are generally provided on such office machines.

Centrifugal brakes for regulating the speed of carriages for typewriters and the like are per se known in the art. In the known carriage brakes for typewriters, the centrifugal members consist of unilaterally mounted brake levers which act on the inner cylindrical surface of a brake housing. The braking force is regulated by adjusting the force of a spring which loads all of the centrifugal members. In order to vary the loading, the centrifugal members are provided with a plurality of different suspension points for the spring. Accordingly, in order to regulate or vary the braking force, the mounting of the spring must be changed, i.e., disconnected and remounted, a process which is both time consuming and complicated. Accordingly, the brakes must be tested for the desired braking force before they are installed into the final device.

It is therefore an object of the present invention to eliminate the above-mentioned drawbacks and to provide an easily actuated and effective speed-regulating device wherein the braking force can be easily adapted to the masses to be braked.

It is a further object of the present invention to provide a relatively simple speed-regulating device wherein the braking force can be easily adjusted while the device is operatively mounted, and without requiring any disassembly thereof.

SUMMARY OF THE INVENTION

The above objects are accomplished according to the present invention by providing a brake housing having a plurality of unilaterally mounted centrifugally actuated brake levers disposed therein with the bearings for the pivotal brake levers being mounted on a rotating control shaft in a manner whereby their radial distance from the control shaft can be adjusted. By adjusting this radial distance, the braking effect produced by the centrifugal members can be adapted or regulated to a desired total braking force in a relatively simple manner, with the braking force depending, for example, on the mass of the particular carriage to which it is affixed.

According to an advantageous feature of the invention, the bearings are mounted on a carrier disc which is coupled to the control shaft for rotation therewith and are radially displaced by means of a guide or cam element.

According to another advantageous feature of the invention, the guide element is constructed in the form of a disc made from a lightweight resilient synthetic material, and is provided with a tongue portion formed by recesses or radial slots whereby the tongue portion may serve as the lever for setting or adjusting the desired braking force. Preferably, according to another feature of the invention, the tongue portion of the guide disc is provided with an elongated raised surface which engages in one of a plurality of recesses or slots in the periphery of the carrier plate in order to lock the guide element in a desired setting. With this arrangement, the tongue portion or setting lever extends beyond the brake housing and consequently can easily be adjusted.

DESCRIPTION OF THE PREFERRED EMBODIMENTS

Figure 1:
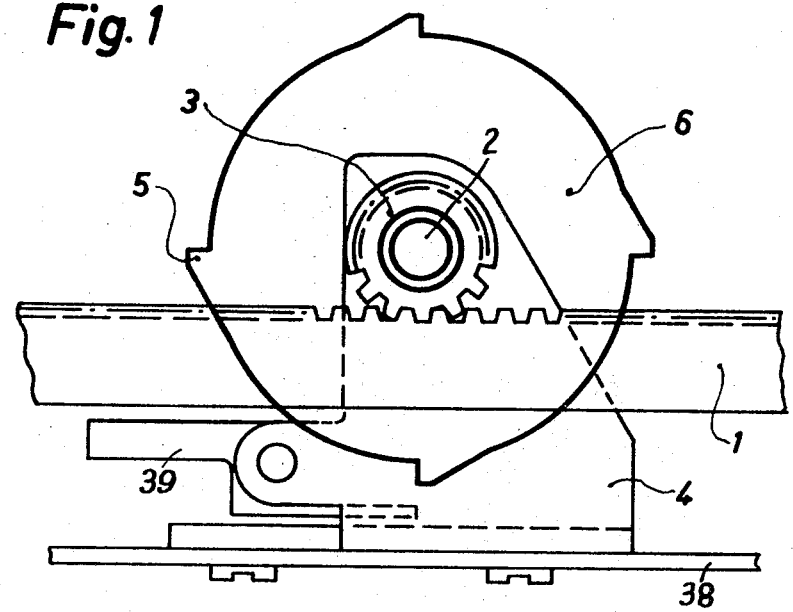
FIG. 1 is a schematic front view of a speed-regulating device according to the invention illustrating its operative relationship to the means driving the rotating control shaft.
Figure 2:
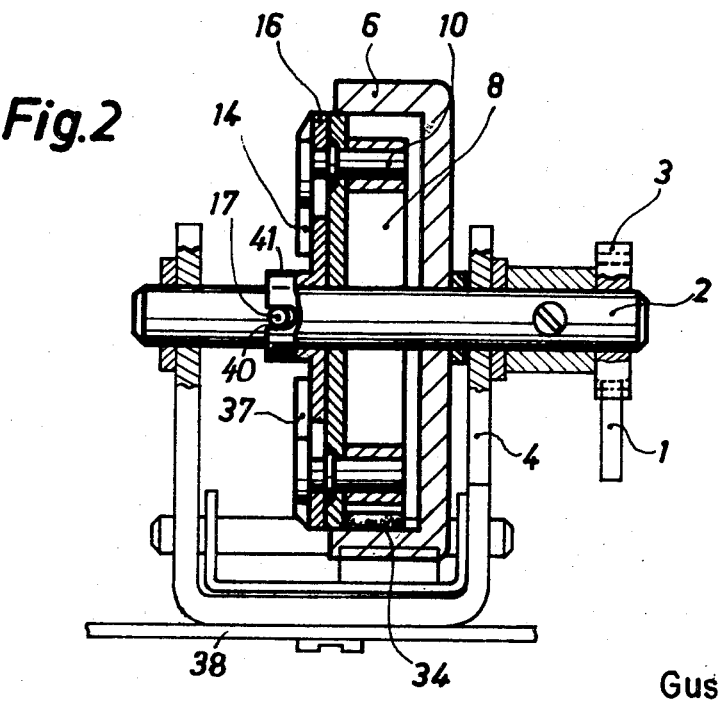
FIG. 2 is a side view, partially in cross section, of a speed regulating device according to the invention.

Referring now to the figures, there is shown a toothed rack 1 which is connected to the device (not shown) whose speed is ultimately to be regulated, for example, a typewriter carriage. Engaging the rack 1 and permanently connected to a control shaft 2, is a pinion gear 3. The control shaft 2 is mounted in a bearing block 4 which is disposed in the machine, the speed of whose carriage is to be regulated, where it is permanently attached to the frame indicated generally by the reference numeral 38. Rotatably mounted on the control shaft 2 is a brake housing 6 provided with a plurality of peripheral abutments 5, which when engaged by the pivotal lever 39, prevents rotation of the brake housing 6.

Mounted within the brake housing 6, are a pair of brake levers 8 and 9 which are studded with brake blocks 7 and 34 respectively. The brake levers 8 and 9 are unilaterally and rotatably mounted on bearing members, indicated generally by the reference numerals 10 and 11 respectively, whose axes are parallel to the axis of the control shaft 2 and are mounted on a carrier disc 16 which is releasably connected to the control shaft 2 for positive rotation therewith by means of a pin 17 which engages a notch 40 formed in a collar 41 provided on the disc 16. Each of the bearing members 10, 11 consists of a slide member 18 and 19 respectively, having respective journal pins 20, 21 disposed thereon. The bearing members 10 and 11 are mounted on the carrier disc 16 in a manner whereby they may be radially displaced by means of slide guides formed by elongated longitudinal or radial holes 12 and 13 through which the respective journal pins 20, 21 are passed, and pairs of guide bars 14, 15 and 35 and 36, 37 which engage the edges of the slide members 18, 19, respectively. Each journal pin 20, 21 is provided with a respective collar 22, 23 which can be passed through an enlarged portion 24, 25 of the longitudinal holes 12 and 13, respectively. By passing the journal pins 20, 21 through the enlarged portions 24, 25 in this manner, and then laterally displacing the pins, the bearing members 10 and 11 may be axially fixed on the carrier disc 16.

In order to vary the radial distance of the baring members 10 and 11 from the axis of the shaft 2, a guide or camming member 27 is rotatably mounted on the shaft 2. Preferably, as illustrated, the camming member 27 is in the form of a disc having a pair of curved or arcuate slots 32 and 33 formed therein with the radial distance of the slots from the center of the disc i.e., the axis of the shaft 2, varying along the length thereof. The journal pins 20 and 21 are passed through these curved slots 32 and 33 respectively, and are positively guided therein so that rotation of the camming member 27 relative to the carrier disc 16 will result in varying the radial distance of the bearing members 10 and 11 from the axis of the shaft 2.

Figure 3:
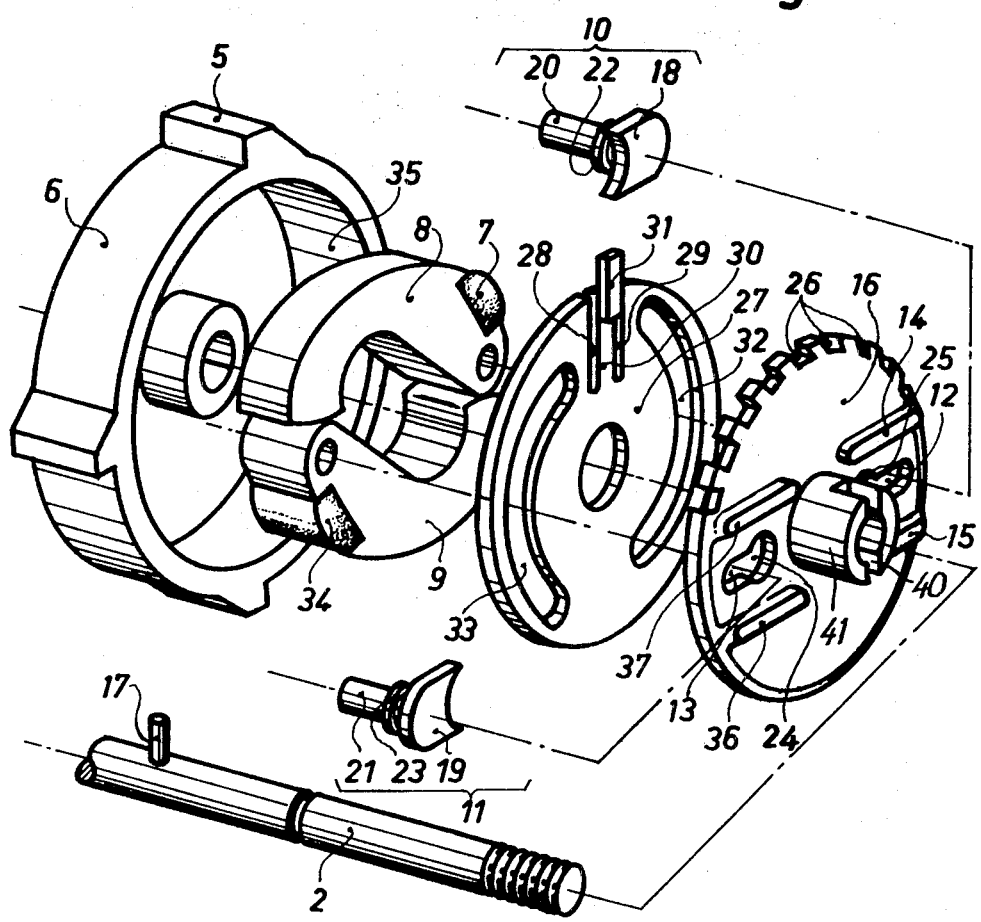
FIG. 3 is an exploded isometric view of the individual components of the speed-regulating device shown in FIG. 2 illustrating their operative relationship to one another.

In order to set the camming member 27 in a fixed position, and consequently provide a desired braking force for the speed-regulating device, the camming member 27 which is preferably formed from a lightweight resilient synthetic material, is provided with a setting lever. As shown in FIG. 3, the setting lever is shaped in the form of a tongue 30 formed by peripheral recesses or slots 28, 29 in the cramming or guide member 27. The tongue portion 30 is provided with a raised or stepped elongated mounting surface 31 which engages one of a plurality of recesses or notches 26 formed in the periphery of the carrier disc 16, depending on the desired braking force for the speed-regulating device.

In operation, and in order to produce a uniform movement for the carriage when tabulating, the brake housing 6 is initially held and made a part of the machine frame by means of actuation of the tabulator key (not shown), which in turn causes the intermediate lever 39 to engage one of the abutments 5. After release of the carriage by the stepping mechanism (not shown) in the stepping direction, the toothed rack 1 disposed on the carriage drives the pinion 3 and consequently rotates the control shaft 2 which is connected thereto. By means of the carrier disc 16 which is connected to the control shaft 2 and positively rotates therewith, the brake levers 8 and 9 are also caused to rotate with the shaft 2, resulting in a centrifugal force being exerted on the brake levers 8 and 9. This centrifugal force causes the brake blocks 7 and 34 of the brake levers 8 and 9, respectively, to come into contact with the inner cylindrical braking surface 35 of the brake housing 6 and produce friction. By adjusting the radial distance of the bearing members 10 and 11 from the axis of the shaft 2 by rotating the camming member 27, the brake force may be varied and the speed of the rotating shaft, and consequently that of the carriage, adjusted to a desired value. The braking force is highest when the bearing members 10 and 11 and the brake lever 8, 9, which are rotatable about the bearing members, are loaded in a clockwise direction, as illustrated, and are at the greatest radial distance from the axis of the control shaft 2. Alternatively, the maximum braking force may be achieved by loading the bearing members 10, 11 and the brake levers 8, 9 in a counterclockwise direction and placing the bearing members 10, 11 at the smallest radial distance from the axis of control shaft 2.

It will be understood that the above description of the present invention is susceptible to various modifications, changes and adaptions, and the same are intended to be comprehended within the meaning and range of equivalents of the appended claims.

I claim:

1. A speed-regulating device comprising, in combination:
   a. a rotating shaft;
   b. a brake housing;
   c. a plurality of centrifugally actuated brake levers disposed within said housing, each of said brake levers being unilaterally mounted to pivot about a separate single bearing means, each of said bearing means having its axis parallel to the axis of said shaft and being mounted on said shaft for rotation therewith; and
   d. means for varying the radial distance of said bearing means from said shaft in order to vary the braking force exerted between said brake levers and said brake housing and thereby regulate the speed of said shaft.

2. The speed-regulating device defined in claim 1 wherein: said bearing means are mounted on a carrier disc coupled to said shaft for rotation therewith; and, said means for varying the radial distance of said bearing means comprises a camming means coupled to said shaft for rotation therewith.

3. The speed-regulating device defined in claim 2 wherein each of said bearing means includes a pin extending from said carrier disc parallel to the axis of said shaft; and wherein said camming means comprises a disc having a plurality of curved camming slots formed therein with the radial distance of said slots from said shaft varying along the length thereof, with each of said pins passing through a different one of said slots, whereby rotation of said camming means relative to said carrier disc varies the radial distance of said bearing means from said shaft.

4. The speed-regulating device defined in claim 2 wherein said camming means is formed of a lightweight resilient synthetic material and is provided with a tongue portion formed therein by means of two radial peripheral slots, said tongue portion serving as a setting lever for adjusting the braking force.

5. The speed-regulating device as defined in claim 4 wherein the periphery of said carrier disc is provided with a plurality of slots and wherein said tongue portion is provided with a raised elongated surface which engages a selected one of said slots in the periphery of said carrier disc, thereby maintaining said camming means and said bearing means in one of a plurality of desired fixed positions.

6. The speed-regulating device defined in claim 5 wherein said elongated portion of said tongue portion of said camming means extends beyond the periphery of said brake housing whereby the braking force can be adjusted without disassembling said speed-regulating device.

7. The speed-regulating device defined in claim 2 wherein each of said bearing means comprises a slide member having a pin mounted thereon with said pins being journal pins, each of said bearing means being mounted on said carrier disc by means of a slide guide on said carrier disc, each of said slide guides including an elongated radially extending hole through which one of said pins is passed, and a pair of guide bars which engage the edges of the corresponding one of said slide members.

8. The speed-regulating device as defined in claim 7 wherein each of said elongated holes is provided with an enlarged portion at one end thereof, and wherein each of said pins is provided with a collar which can be passed through said enlarged portions and then engage the surface of said carrier disc along the remainder of said elongated holes and thereby fix the axial position of said bearing means.

9. The speed-regulating device as defined in claim 3 wherein each of said bearing means comprises a slide member having one of said pins mounted thereon with said pins being journal pins, each of said bearing means being mounted on said carrier disc by means of a slide guide on said carrier disc, each of said slide guides including an elongated radially extending hole through which one of said pins is passed, and a pair of guide bars which engage the edges of the corresponding one of said slide members; and wherein each of said elongated holes is provided with an enlarged portion at one end thereof and each of said pins is provided with a collar which can be passed through said enlarged portion and then engage the surface of said carrier disc along the remainder of said elongated hole and thereby fix the axial position of said bearing means.

10. The speed-regulating device defined in claim 9 wherein said camming means is formed of a lightweight resilient synthetic material and is provided with a tongue portion formed therein by means of two radial peripheral slots, said tongue portion serving as a setting lever for adjusting the braking force; the periphery of said carrier disc is provided with a plurality of slots; and said tongue portion is provided with a raised elongated surface which engages a selected one of said slots in the periphery of said carrier disc, thereby maintaining said camming means and said bearing means in one of a plurality of desired fixed positions.

11. The speed-regulating device of claim 10 wherein said elongated portion of said tongue portion of said camming means extends beyond the periphery of said brake housing whereby the braking force can be adjusted without disassembling said speed-regulating device.

* * * * *